3,019,038
FITTING
William M. Cline, Rives Junction, and William G. Clemons, Jackson, Mich., assignors to Aeroquip Corporation, Jackson, Mich., a corporation of Michigan
Filed May 26, 1958, Ser. No. 737,736
2 Claims. (Cl. 285—243)

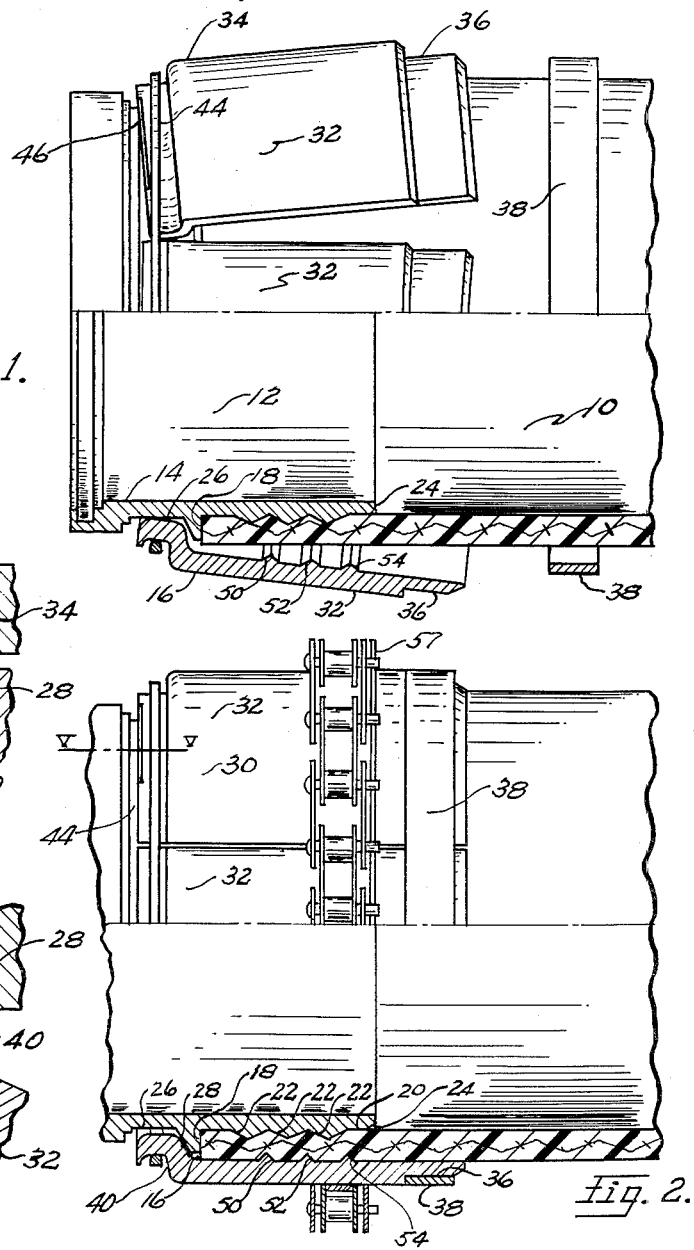

The present invention relates to improvements in segmented end fittings for flexible hose, being particularly concerned with the provision of a light weight, detachable, reuseable fitting for large size hose such as six and seven inch refueling-at-sea hose.

Heretofore it has been the practice to use bolts to draw the segments together in attaching end fittings for hose in the size range of 2½" to 6" internal diameter. However, the use of bolted segments is particularly undesirable upon hose which is to be dragged over decks of ships as the protrusion of the bolts are apt to catch upon gear on deck.

According to the present invention, a light weight, relatively smooth contoured segmented end fitting has been provided in which a pair of rings or bands are employed to retain the segments in place after they have been pressed into position by a special assembly tool.

In practice, refueling hose is operated under pressures in the order of 100 p.s.i. However, existing specifications require the hose to have a burst capacity of 600 p.s.i. Thus, it becomes desirable to provide an end fitting which will neither blow off nor leak under pressure within the burst capacity of the hose.

The commercial form of the invention, as illustrated herein, comprises a smooth contoured segmented socket having smooth surfaced rings or bands at opposite ends for holding the segments in position to compress the hose between the nipple and socket to prevent leakage and blow off. Preferably, the rings or bands take the form of a solid non-adjustable annular member with the ring or band at one end of the socket functioning as a fulcrum under which the segments are hooked and rocked inwardly by the assembly tool to bring the segments into parallelism with the longitudinal axis of the nipple to permit the other ring or band to be assembled upon the opposite end of the socket to maintain the compressive forces acting upon the hose as created by the assembly tool.

Thus, an object of the invention is to provide an end fitting for large size flexible hose which is light in weight, detachable and reuseable in service, with a segmented socket which is contracted upon the hose without deformation of the socket and held in its contracted position by a removable, reuseable band.

Another object is to provide a smooth contoured large size end fitting for flexible hose which is well adapted for use upon ships for refueling at sea.

A further object is to provide a detachable, reuseable, end fitting having a segmented socket which will adjust itself to hose of irregular wall thickness.

These and other objects and advantages residing in the specific details of construction will appear from the following description and claims.

In the drawings,

FIG. 1 is a fragmentary side elevational view of the end fitting shown applied to hose prior to construction of the segmented socket, and partly shown in vertical section, FIG. 2 is a view similar to FIG. 1 with the assembly tool in position and the socket fully contracted, FIG. 3 is a side elevational view of a segment of the socket, FIG. 4 is an end view of FIG. 3, FIG. 5 is a view taken on line V—V of FIG. 2, and FIG. 6 is a view similar to FIG. 5 showing the segment in the position of FIG. 1.

The hose 10 is shown of the general type used for refueling ships at sea, being of large diameter and having an inner liner of synthetic rubber overlaid by a wrapped fabric reinforcement of the construction similar to the multi-ply cord used in the fabrication of pneumatic tires and over this a synthetic rubber cover, all said components being firmly bonded together. Specification for ship use requires that the hose 10 be furnished in sizes of 6" to 7" inside diameter with a burst capacity of 600 and 500 p.s.i. respectively. To test such a hose at burst pressures, the end fittings must be capable of resisting end loads in the order of 20,000# without blow off of the fitting. With the end fitting to be used in service, the end fitting must be capable of resisting end loads in the order of 20,000# without blow off.

The fitting for the hose 10 comprises a nipple 12 of which only the portion inserted into the bore of the hose 10 is shown, it being understood that the terminal end coupling structure associated with the nipple constitutes no part of the present invention. As shown the nipple 12 has a cylindrical bore 14 of a diameter which is only slightly less than the inside diameter of the hose 10. In practice, with a hose of a 7" bore, the bore 14 of the hose 10 may be 6.8". Upon assembly, the nipple 12 is inserted into the bore of the hose 10 until the end 16 of the hose 10 abuts the annular radial shoulder 18 of the nipple 12. Such insertion results in the expansion of the hose 10 as the cylindrical outer surface 20 of the nipple 12 has a diameter of 7.15". Spaced along the surface 20 approximately .60" apart are annular ribs 22 which, in practice, project .10" above the surface 20. In practice e, the axial distance between the leading end 24 and the shoulder 18 may be approximately 50% of the diameter of the bore of the hose 10. Axially spaced from the shoulder 18 is an annular recess 26 having a conical seat 28.

To attach the expanded portion of the hose upon the nipple 12, a segmented socket generally designated 30 in FIG. 2 is provided. In practice the socket 30 comprises five identical segments 32 each defining 72° of the completed cylindrical socket 30. As more clearly shown in FIGS. 3, 4 and 5, each segment 32 has an outer cylindrical surface 34 having a step 36 at its outer end to receive and locate the assembly band 38. At the opposite end, each segment 32 has an L-shaped flange which defines a shoulder 40 and a ledge 42. The shoulder 40 has a radius to enable it to have line contact along the flat surface of the conical seat 28 on the nipple 12. A fulcrum ring 44 is received upon the ledge 42, the ledge 42 being shown generally cylindrical except for an arcuate radial hook portion 46 which is located centrally upon the ledge 42 along the outer edge, as shown in FIGS. 4 and 5.

The inner surfaces 48 of the segmented socket 30 are shaped to collectively define a cylindrical bore each having segmental annular ribs 50, 52 and 54 which are spaced along the surfaces 48 .60" apart and located to fall between the ribs 22. With the wall thickness of the hose 10 in the order of .36" to .45", it has been found satisfactory to have the ribs 50, 52 and 54 project .230", .245" and .215", respectively. It will be noted that the rib 52 projects slightly more than the rib 50, as might be expected, in view of the fact that the segments 32 are urged into compressive relation to the hose 10 and nipple 12 by being fulcrumed around one end of the point of engagement between the hook 46 on the ring 44. However, the need for lesser projection of the rib 54 has been found necessary to prevent damage to the fabric reinforcement of the hose 10 during pressurization of the hose assembly.

To assemble the end fitting comprising the nipple 12, segmented socket 30, band 38 and fulcrum ring 44, the hose 10 is first cut off squarely to length. The band 38 is then placed over the end of the hose as indicated in FIG. 1. Next the nipple 12, with the ring 44 located in the recess 26, is inserted into the bore of the hose 10 to bring the end 16 against the shoulder 18. Segments 32 are then hooked under the fulcrum ring 44 and assume the position shown in FIG. 1.

In order to bring the segments 32 into parallelism with each other to collectively define the cylindrical socket 30 and to enable the band 38 to be disposed upon the ledge 36, some form of radially inward acting force is required. As shown in FIG. 2, a contractible band 57 of roller chain construction is shown embracing the outer circumference of the segmented socket 30. Contraction of the band 57 has caused the segments 32 to fulcrum about the ring 44 into the position of FIG. 2 with compressive force being set up upon the hose 10 located between the nipple 12 and the segments 32. With the segments 32 in parallelism with each other the band 38 may be received upon the ledge 36 to hold the segments 32 in position when the assembly band 57 is removed. For a more detailed disclosure of the assembly band 57, reference may be made to assignee's application Serial No. 751,541, filed July 28, 1958.

Referring to FIG. 6, it will be noted that the radiused shoulder 40 of the socket segment 32 engages with the conical seat 28 at an inward position. When the segment 32 fulcrums around the ring 44 the point of engagement between the seat 28 and the shoulder 40 move inwardly to move the segmented socket 30 in a direction tending to urge the hose 10 against the shoulder 18 of the nipple 12.

It has been found that the wall of the hose 10 may vary in thickness as much as .050" about its circumference. Thus, the nipple 12 may be eccentric to the outside of the hose 10 by as much as .050". The conical surface 28 upon which the socket segments 32 are seated will permit the socket segments to adjust themselves to this eccentricity with the result that the individual segments 32 are able to exert a substantially uniform compression upon the hose 10 about its entire circumference notwithstanding the variations in wall thickness about the circumference of the hose confined between the nipple 12 and the socket 30. This result has been accomplished in practice by having the cylindrical surface 56 of slightly larger diameter than the diameter of the cylindrical portion of the recess 26. In the example illustrated, the diameter of the cylindrical surface 56 is 7.300" while the diameter of the cylindrical portion of the recess 26 is 7.150".

It will be noted that the staggered arrangement of the ribs 22 on the nipple 12 and the ribs 50, 52 and 54 causes the hose to be compressed along a sinuous form. The location of the crest of the ribs of one part in opposed relation to the valleys between the ribs of the other part was found necessary in order to burst the hose 10 without leakage or blow off.

Preferably, the solid fulcrum ring or band 44 has an inside diameter that will pass over the radial projection on the nipple 12 which is defined by the shoulder 18 on one side and the conical seat 28 on the other side. This permits the ring 44 to be conveniently passed over one end of the nipple 12 and to be disposed in the recess 26. In the illustrated example the inside diameter of the ring 44 is 7.805" and the diameter of the ledge 42 of the segments 32 is 7.800".

To facilitate the collective hinging of the segments 32 about the ring 44 by the contracting assembly tool to enable the installation of the band 38 several structural features of the segmented socket 30 should be noted. The rounded shoulders 40 permit the segments to readily move along the conical seat 28. The axial length of the segments 32 substantially exceeds that of the hose inserted length of the nipple 12 to increase the lever arm effect at the time of contraction by the assembly tool. When the segments are sufficiently hinged to contract them to a diameter to receive the band 38, the cylindrical surface collectively defined by the axial wall of the ledge 42 if axially projected will intersect the ribs 50, 52 and 54.

To provide a light weight end fitting the rings or bands 38 and 44 are preferably of steel heat-treated to 180,000 tensile with the segments 32 of aluminum alloy, cast or forged, and the nipple 12 of cast or extruded aluminum alloy. As will be noted from FIG. 2, the construction of the socket 30 and the association of the rings or bands 38 and 44 therewith is such that the contour of the fitting is smooth and free from projection, thus making the fitting highly suitable for on ship deck use.

While the structural design herein described is particularly adapted to hose size in the 6"–7" range, it is equally useful in smaller sizes and may be applied to the full range of commercial sizes, without departing from the scope of the invention and the appended claims. Also the number of segments 32 may be varied depending, for the most part, upon the diameter of the socket 30, the smaller the diameter of the socket the fewer the number of segments normally required.

Having thus described our invention what we wish to protect by Letters Patent is:

1. A detachable, reuseable end fitting characterized by its relatively smooth outer contour, lightness of weight and adaptability to large size flexible hose comprising a nipple having a generally cylindrical portion which is inserted into the hose end, radial projection structure carried on said nipple and axially spaced from said cylindrical portion of said nipple defining a radially extending hose end stop surface on the side of the projection adjacent said cylindrical portion and a conical blow off stop surface on the side of the projection remote from said cylindrical portion converging away from said cylindrical portion, a segmented socket for embracing and compressing a hose mounted on said nipple and embracing said hose end stop, said socket having generally cylindrical inner and outer surfaces and outer ledges at opposite ends to receive a pair of annular retaining members for supporting said socket assembled on said nipple in a contracted position, one of said members being a radially movable solid ring fulcrum band, having in cross section a convex inner periphery and the other retaining band, said socket being collectively defined by a plurality of independent segments, each of said segments at opposite ends defining an arcuate portion of said ledges, each of said segments having a fulcrum end having a radiused shoulder on its inner surface to engage said conical blow off stop surface to resist axial movement relative to said nipple in a blow off direction, the segment portion connecting said fulcrum end and the hose end embracing portion extending between said fulcrum band and radial projection, said arcuate portion of each segment at its fulcrum end engaging under the inner convex surface of said fulcrum band as a hinge point about which each segment is rocked to compress the hose upon said nipple and to dispose said arcuate portion of said ledge at the ends of said segments opposite said fulcrum end within a common cylindrical surface to receive said retaining band, said radiused shoulders engaging said conical blow off stop surface during rocking of said segments, the difference in the radial dimensions of the inner surface of said fulcrum band and the fulcrum band encompassed portion of said nipple being greater than the radial thickness of said fulcrum ends, said fulcrum end ledge being stepped radially inward to provide an outwardly facing, generally cylindrical surface of lesser outside diameter than the remaining portion of the socket which embraces the hose end and approximately the diameter of said inner surface of the socket which embraces the hose end, said ledge at the fulcrum end of each segment extending radially inwardly from the outer cylindrical surface of each segment and having a hooked edge forming a channel for engagement with said fulcrum band.

2. A detachable, reuseable end fitting as defined in claim 1 wherein said nipple and socket have annular ribs upon their opposed cylindrical surfaces for gripping the hose.

References Cited in the file of this patent

UNITED STATES PATENTS

| | | |
|---|---|---|
| 409,066 | Ravenel | Aug. 13, 1899 |
| 1,390,564 | Knorr | Sept. 13, 1921 |
| 1,778,244 | Cadden | Oct. 14, 1930 |
| 1,876,639 | Disler et al. | Sept. 13, 1932 |
| 1,887,877 | Shaffer | Nov. 15, 1932 |
| 2,280,892 | Cowles | Apr. 28, 1942 |
| 2,784,987 | Corcoran | Mar. 12, 1957 |
| 2,890,900 | Williamson et al. | June 16, 1959 |

FOREIGN PATENTS

| | | |
|---|---|---|
| 737,252 | Germany | June 3, 1943 |